United States Patent Office 2,719,379
Patented Oct. 4, 1955

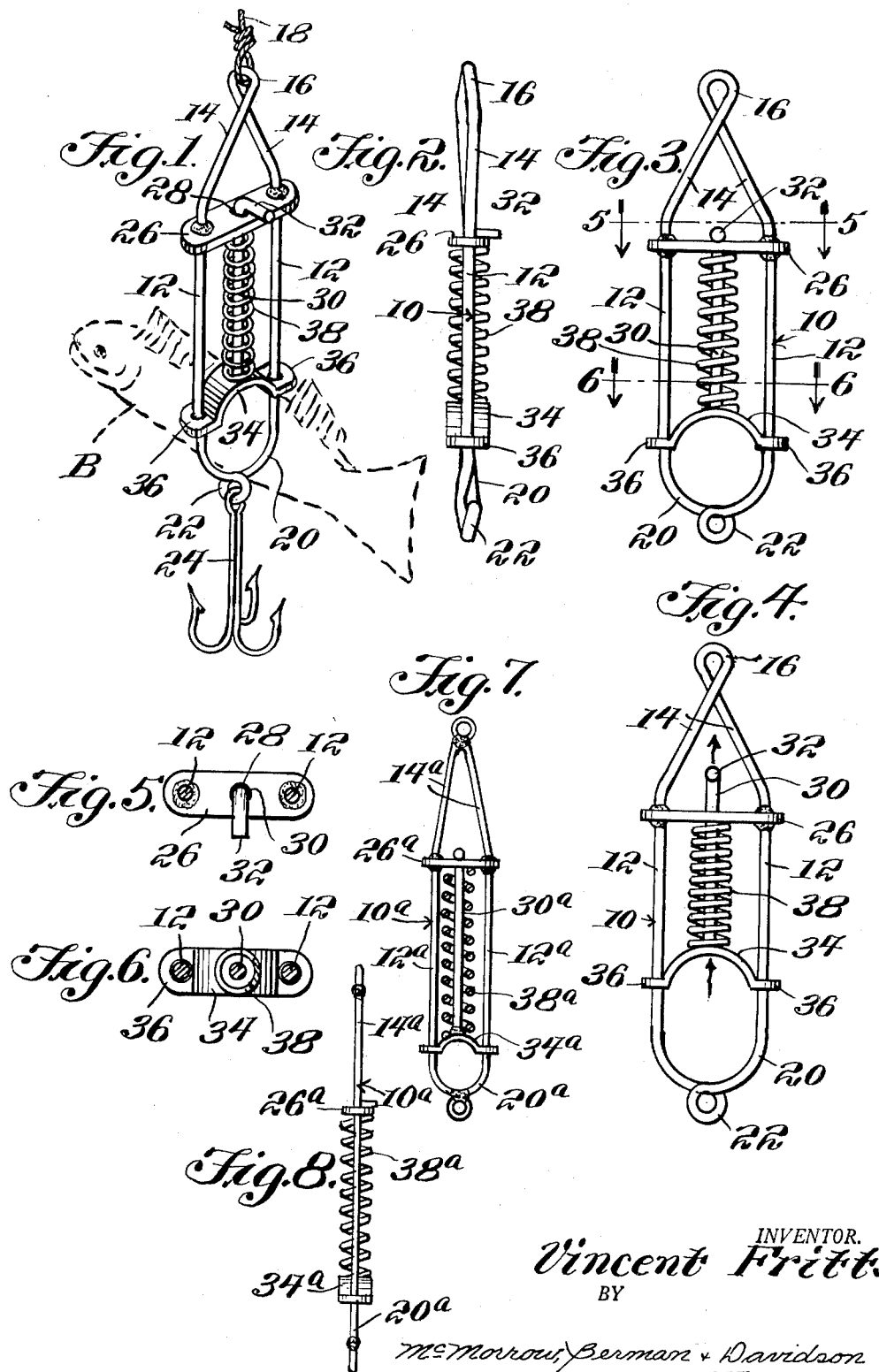

2,719,379

LIVE BAIT HOLDER

Vincent Fritts, Dover, N. J.

Application February 18, 1955, Serial No. 489,031

3 Claims. (Cl. 43—44.6)

This invention relates to a device for holding live bait.

One of the important objects of the present invention is to provide a device as stated which will be so designed as not to kill or injure the live bait, thus keeping the bait in an active condition over a long period of time.

Another object of importance is to provide a bait holder as stated which will be particularly designed to hold the bait firmly in place.

A further object of importance is to provide a holder which will locate the hook between the fish and the live bait. In conventional practice, it is customary to hook the bait. By this action, one places the hook on the far side of the bait, away from the fish and the fish must take the bait before it takes the hook. By reason of the particular design of the present invention, this undesirable characteristic of conventional devices is eliminated, thereby increasing measurably the efficiency of the device in catching fish.

Still another object is to provide a device as described which will facilitate the attachment thereof to a minnow or other type of live bait, and which will further be adapted to facilitate to an equal degree the removal of the live bait, should it be desired to substitute a new bait.

Other objects will appear from the following description, the claims appended thereto, and from the annexed drawing, in which like reference characters designate like parts throughout the several views, and wherein:

Figure 1 is a perspective view of the bait holding device, a minnow being shown in dotted lines in the position which it assumes when held by the device;

Figure 2 is an edge elevational view;

Figure 3 is a front elevational view;

Figure 4 is a view similar to Figure 3 in which the plunger has been retracted to insert or extract the live bait;

Figure 5 is a transverse sectional view on line 5—5 of Figure 3;

Figure 6 is a transverse sectional view on line 6—6 of Figure 3;

Figure 7 is a view similar to Figure 3 showing a slightly modified construction; and Figure 8 is an edge elevational view of the form shown in Figure 7.

The bait holding device constituting the present invention includes a wire frame generally designated 10. The frame is shaped with elongated, straight, guide rods 12 merging at their upper ends into upwardly convergent end portions 14 which in turn merge at their convergent ends into the opposite ends of a loop or eye 16 to which can be connected a fishing line or leader 18. At their lower ends, the guide rods 12 merge into a bight portion 20 of semicircular shape (see Figure 3), said bight portion medially between its ends being integrally formed with a depending eye 22 to which can be connected any of various types of hooks 24.

At their upper ends, where they merge into the upper end portions 14, the guide rods 12 extend through openings formed in the opposite ends of a flat, relatively narrow reinforcing plate 26 extending transversely of the frame in the space between the guide rods. The guide rods are soldered or otherwise fixedly secured within the plate openings. The plate has, medially between its ends, an aperture 28 in which is slidably engaged a plunger 30 spaced equidistantly from the guide rods 12 in parallel relation thereto and formed at its upper end with a lateral projection 32 overlying plate 26 to provide a handle by means of which the plunger can be raised to the position thereof shown in Figure 4.

At its lower end, the plunger is fixedly secured to the intermediate portion of a movable clamp element or slide 34. This is also formed from plate material, and extends within the space between the guide rods. Within said space, the clamp element 34 is of arcuate formation, being bowed oppositely to the bight 20, the bight 20 constituting a fixed clamp element cooperating with the movable clamp element 34. At its opposite ends, the movable clamp element has coplanar, short ears 36 apertured to slidably receive the guide rods 12.

A spring 38 of the coil type receives the plunger in the space between the plates 26, 34, and is held under compression tending to bias the clamp plate 34 toward the bight 20.

It will be seen that by reason of this arrangement, a live bait B, as for instance, a minnow, can be inserted in the space between the fixed and movable elements 20, 34, with the plunger held in elevated position against the restraint of spring 38 in the manner shown in Figure 4. When the bait has been fully inserted, the handle 32 is released, and the spring, tending to expand, shifts the clamp plate 34 against the bait, straddling the bait and causing the bait to be clamped between the elements 20, 34.

The device is now ready for use, and in fishing operations, the fish, seeing the live bait, will strike at the same time, taking the hook 24.

An important characteristic of the invention resides in the fact that the bait is not impaled or otherwise damaged in any way, and thus is kept in a completely active condition at all times. Further, the bait can be easily engaged in the holder or removed therefrom, with minimum loss of time that might otherwise be devoted to fishing.

In Figures 7 and 8 a slightly modified form is shown. In this form of the invention, the frame 10a has guide rods 12a which are of greater length than and are not spaced as far apart as the guide rods 12. The guide rods 12a are secured at their upper ends to a top plate 26a, and above the top plate 26a the guide rods merge into convergent end portions 14a disposed at a smaller acute angle to one another than are the portions 14, the end portions 14a being substantially greater in length than the portions 14. The plunger 30a works in the plate 26a in the manner previously described, and extending thereabout is a coil spring 38a bearing against a movable clamp plate 34a slidable on guide rods 12a and fixedly secured to the plunger, the spring biasing the movable clamp element 34a toward a semicircular bight portion 20a. In all other respects the device is the same as that previously shown herein.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A holder for live bait comprising a frame including a pair of spaced guide rods; means at one end of the guide rods for attaching a fishing line; a bight portion connecting the guide rods at their other ends and defining a stationary clamp element for live bait; means for connecting a hook to the bight portion; a top plate extending between and fixedly secured to the guide rods; a plunger slidable in the top plate in parallel relation to the guide rods; a movable clamp element slidably mounted upon the respective guide rods and secured to the plunger; and a spring interposed between the movable clamp element and the top plate and maintained under tension effective to resiliently and yieldably force the movable clamp element toward said bight portion, for clamping a live bait between the bight portion and movable clamp element.

2. A holder for live bait comprising a wire frame formed from a single length of wire material shaped to include a pair of straight, parallel guide rods, convergent end portions formed upon one end of the guide rods, a line-receiving eye formed upon the convergent ends of the end portions, and an arcuate bight portion extending between and connecting the guide rods at their other end, said bight portion being adapted for connection of a hook thereto; a plate extending between and fixedly secured to the guide rods adjacent said convergent end portions, said plate having an opening; a plunger slidable in the opening of said plate and paralleling the guide rods; a movable clamp element extending between and slidably mounted at its ends upon the guide rods, said movable clamp element being fixedly secured to the plunger and being arcuately bowed intermediate its ends oppositely to said bight portion, for engagement of a live bait between the bight portion and the movable clamp element; and spring means extending about the plunger and abutting at its opposite ends against the plate and movable clamp element respectively, said spring means being under tension effective to bias the movable clamp element in the direction of the bight portion.

3. A holder for live bait comprising a relatively elongated, open frame closed at its opposite ends, one end of said frame being adapted for a connection of a line thereto and the other end being adapted for connection of a hook thereto; a plate extending between and fixedly connected at its ends to opposite sides of the frame intermediate the ends of the frame; a plunger slidably mounted in said plate within the frame; a movable clamp element sliding upon opposite sides of the frame and secured to said plunger; and spring means engaged between said plate and movable clamp element tending to bias the movable clamp element toward one end of the frame, for engagement of a live bait between the movable clamp element and said one end of the frame.

References Cited in the file of this patent
UNITED STATES PATENTS

| | | |
|---|---|---|
| 655,951 | Bates | Aug. 14, 1900 |
| 841,951 | Evans | Jan. 22, 1907 |
| 1,459,445 | Elderton et al. | June 19, 1923 |
| 2,602,257 | Morgan | July 8, 1952 |
| 2,634,475 | Browne | Apr. 14, 1953 |